United States Patent
Trempert

(10) Patent No.: US 10,864,773 B2
(45) Date of Patent: Dec. 15, 2020

(54) CASTOR SUSPENSION SYSTEM

(71) Applicant: TRUMPF MEDIZIN SYSTEME GMBH + CO. KG, Saalfeld (DE)

(72) Inventor: Alexander Trempert, Saalfeld (DE)

(73) Assignee: TRUMPF MEDIZIN SYSTEME GMBH + CO. KG, Saalfeld (DE)

( * ) Notice: Subject to any disclaimer, the term of this patent is extended or adjusted under 35 U.S.C. 154(b) by 0 days.

(21) Appl. No.: 16/456,801

(22) Filed: Jun. 28, 2019

(65) Prior Publication Data

US 2020/0016930 A1 Jan. 16, 2020

(30) Foreign Application Priority Data

Jul. 10, 2018 (EP) .................................... 18182667

(51) Int. Cl.
*B60B 33/04* (2006.01)
*A61G 13/10* (2006.01)

(52) U.S. Cl.
CPC .......... *B60B 33/045* (2013.01); *A61G 13/104* (2013.01); *B60B 2200/20* (2013.01); *B60B 2900/113* (2013.01); *B60B 2900/114* (2013.01); *B60B 2900/115* (2013.01)

(58) Field of Classification Search
CPC ..... B60B 33/045; B60B 33/04; B60B 33/066; B60B 2200/20; B60B 2900/113; B60B 2900/114; B60B 2900/115; A61G 13/104; A61G 13/10
USPC .......................................................... 280/79
See application file for complete search history.

(56) References Cited

U.S. PATENT DOCUMENTS

| | | | |
|---|---|---|---|
| 2,980,944 A | 4/1961 | Bolinger | |
| 4,763,910 A * | 8/1988 | Brandli | B60B 33/0042 280/29 |
| 6,594,856 B1 * | 7/2003 | Cherukuri | B60B 33/0005 16/32 |
| 8,122,535 B2 * | 2/2012 | Hensley | A61G 7/0528 5/86.1 |
| 8,839,487 B2 * | 9/2014 | Plate | B60B 33/045 16/44 |
| 9,636,948 B2 * | 5/2017 | Hillaert | A45C 5/14 |
| 2015/0096815 A1 * | 4/2015 | Ottenweller | A61G 7/0533 180/19.1 |

FOREIGN PATENT DOCUMENTS

| | | |
|---|---|---|
| EP | 3075567 | 10/2016 |
| GB | 246483 | 11/1926 |
| GB | 582371 | 11/1946 |

* cited by examiner

*Primary Examiner* — John D Walters
(74) *Attorney, Agent, or Firm* — Barnes & Thornburg LLP

(57) ABSTRACT

A castor suspension system for suspending a first castor at a patient support device is provided. The castor suspension system comprises a pivoting suspension link pivotably attachable to the patient support device, and a springy element comprising a leaf spring made of a band deformed such that the band makes at least one U-turn so that the band has a first leg and at least one second leg. One of the first leg and the at least one second leg is provided with a first support portion supported on the pivoting suspension link, and the other of the first leg and the at least one second leg is provided with a second support portion for supporting the springy element with respect to the patient support device such that the springy element is configured to provide a pre-stress force to the pivoting suspension link.

20 Claims, 9 Drawing Sheets

CASTOR SUSPENSION SYSTEM

CROSS-REFERENCE TO RELATED APPLICATIONS

This application claims the benefit of European Patent Application Serial No. 18182667.8, filed on Jul. 10, 2018, the entire disclosure of which is incorporated herein by reference.

BACKGROUND OF THE INVENTION

The invention relates to a castor suspension system, in particular, to a castor suspension system provided in a patient support device.

Heretofore, patient support devices including castor suspension systems are known. Usually, the patient support device comprises an appropriate number of castors which can be swiveled around a vertical axis at the outside area of the patient support device and, in a central bottom area of the patient support device, an additional castor for driving the patient support device or for controlling a direction of motion of the patient support device. Commonly, this additional castor can be moved in a vertical direction with respect to the patient support device and it is pre-stressed by a gas pressure spring.

However, the use of the gas pressure spring includes the disadvantages that the gas pressure spring requires a large installation space and that assembly is labour-intensive due to a large number of required mounting parts.

Therefore, the object underlying the invention is to provide a castor suspension system and a patient support device which remedy the above-mentioned disadvantages, which provide a larger stroke of the suspension system without requiring larger installation space, and which can be assembled in an economic way. The object is achieved by the castor suspension system according and the patient support device according to the present disclosure

SUMMARY

According to an aspect of the present disclosure, a castor suspension system comprises a pivoting suspension link pivotably attachable to a patient support device and a springy element comprising a leaf spring made of a band deformed such that the band makes at least one you-turn so that the band has a first leg and at least one second leg. One of the first leg and the at least one second leg is provided with a first support portion supported on the pivoting suspension link and the other of the first leg and the at least one second leg is provided with a second support portion for supporting the springy element with respect to the patient support device to provide a pre-stress force to the pivoting suspension link.

Due to the use of the springy element having such configuration, there is no need to use the gas pressure spring requiring a large installation space and a large number of sophisticated mounting parts and, therefore, the assembly is simplified and more economic.

According to an implementation of the castor suspension system, the band is made of spring band steel.

The spring band steel is easily to be purchased and it can be easily configured such that it provides the required characteristics, i.e. a spring constant and a maximum deflection.

According to a further implementation of the castor suspension system, the springy element comprises two U-turns such that it comprises two second legs.

When the springy element comprises two U-turns, the pre-stress for can uniformly be exerted to the pivoting suspension link.

According to another implementation of the castor suspension system, the springy element has a shape of an open-loop.

When being provided with the shape of an open-loop, the production of the springy element is easier and an assembly can be enabled even if further components require installation space.

According to a further implementation of the castor suspension system, the two second legs are joined to one another so that the springy element has a shape of a closed loop.

By the shape of the closed-loop, handling and mounting of the springy element is facilitated.

According to another aspect of the present disclosure, a patient support device comprises the castor suspension system and the first castor suspended by the castor suspension system.

When the castor suspension system is provided at the patient support device, the required installation space is reduced and the castor suspended by the castor suspension system can be completely immersed in a chassis of the patient support device and, furthermore, the required installation space is reduced.

According to an implementation of the patient support device, the castor suspension system is provided with a drive for rotatably driving the first castor.

By providing the drive, the first castor can be used for driving a motion of the patient support device.

According to a further implementation of the patient support device, the patient support device comprises further castors respectively located in an edge area of the patient support device and lowest points of treads of the further castors form a plane, and the first castor is located in a central bottom area of the patient support device.

By the first castor located in the central bottom area of the patient support device, no further obstacle in a bottom edge area of the patient support device exists such that an access to a patient is not deteriorated.

According to another implementation of the patient support device, the castor suspension system is configured to pivot the first castor such that the lowest point of the first castor can be moved to at least 10 mm below the plane and to pre-stress the pivoting suspension link by the springy element in this position of the first castor.

When the first castor can be moved to at least 10 mm below the plane, wherein it is still pre-stressed in this position, a steering function or a driving function of the first castor can be maintained even when crossing an obstacle, e.g. a threshold, by the remaining castors.

According to a further implementation of the patient support device, the castor suspension system is configured to pivot the first castor such that the lowest point of the first castor can be moved to at least 18 mm above the plane and to pre-stress the pivoting suspension link by the springy element in this position of the first castor.

Due to the possible movement to at least 18 mm above a plane and the pre-stress of the pivoting suspension link in this position, the first castor does not hinder crossing of the obstacle.

According to another implementation of the patient support device, the castor suspension system is configured to provide the pre-stress force to the first castor such that the contact force to the floor is about 400 N when the pivoting suspension link is deflected such that the lowest point of the tread of the first castor is located on the plane.

When providing such a contact force, a safe steering or driving by the first castor is ensured.

According to another implementation of the patient support device, the downwardly-directed pre-stress force to the first castor is maximum 1300 N when the pivoting suspension link is maximally upwardly deflected.

By the limitation of the downwardly-directed pre-stress force to the first castor to 1300 N, prevention of overload of the first castor is ensured.

BRIEF DESCRIPTION OF THE DRAWINGS

Now, the invention is elucidated by means of embodiments referring to the attached drawings.

In particular.

DETAILED DESCRIPTION OF THE DRAWINGS

Figure 1:
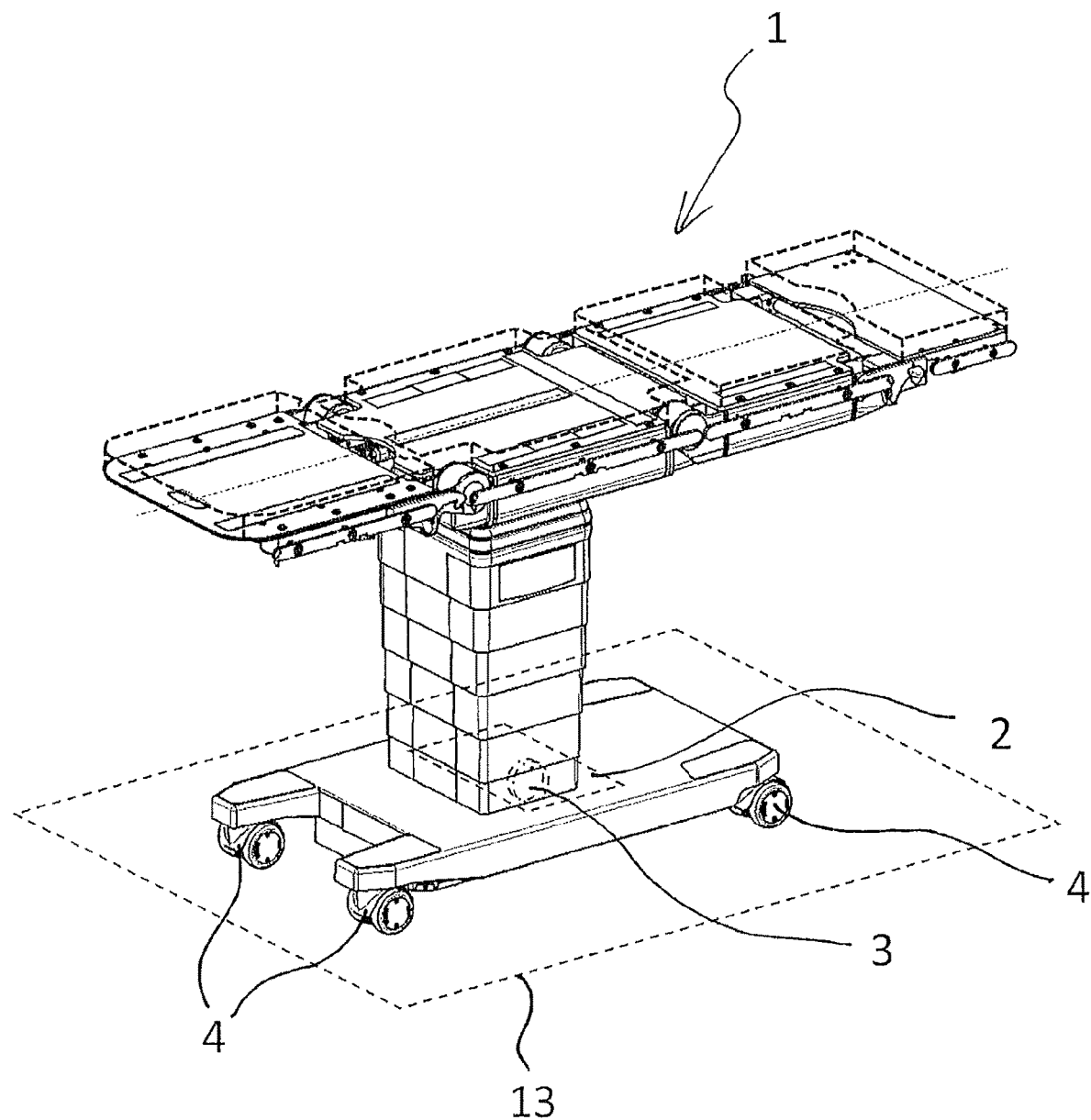
FIG. 1 shows a patient support device in the form of an operating table.

FIG. 1 shows a patient support device 1 in the form of an operating table. The patient support device 1 comprises a castor suspension system 2 and a first castor 3 suspended by the castor suspension system 2. The first castor 3 is located in the central bottom area of the patient support device 1. In alternative embodiments, the first castor 3 can be located in another bottom area of the patient support device 1, e.g. in an edge area as long as it does not deteriorate access to a patient.

The patient support device 1 comprises further castors 4 respectively located in the edge area of the patient support device 1, wherein merely three further castors 4 are visible in FIG. 1. Lowest points of treads of the further castors 4 form plane 13. In use, this plane 13 is to be equatable with a floor. In alternative embodiments, the number of the further castors 4 can differ and also the location of the further castors 4 can differ as long a safe footing of the patient support device 1 and a sufficient access to the patient are ensured.

Figure 2:
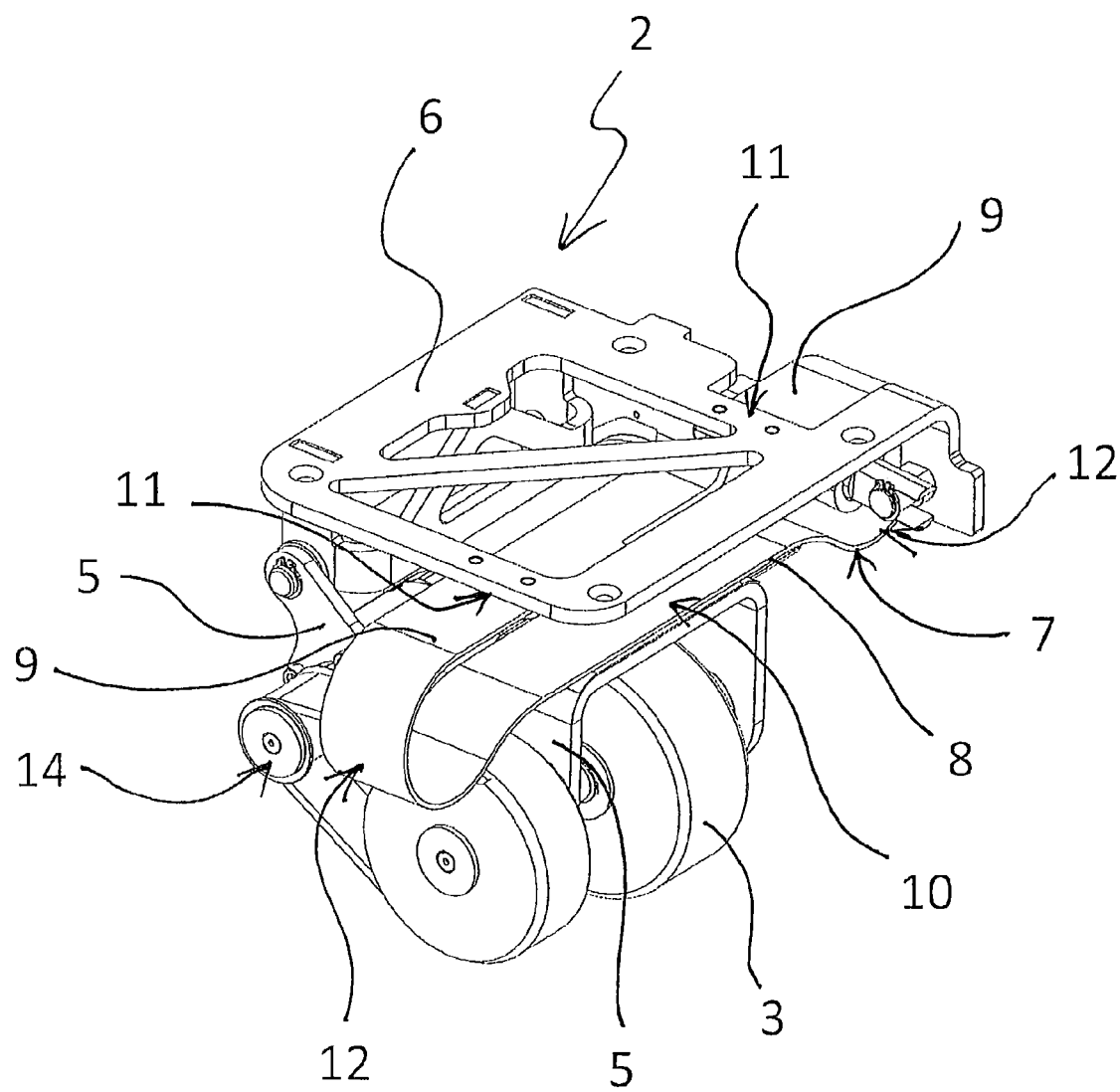
FIG. 2 shows an isometric view of an embodiment of a castor suspension system according to the present disclosure.
Figure 3:
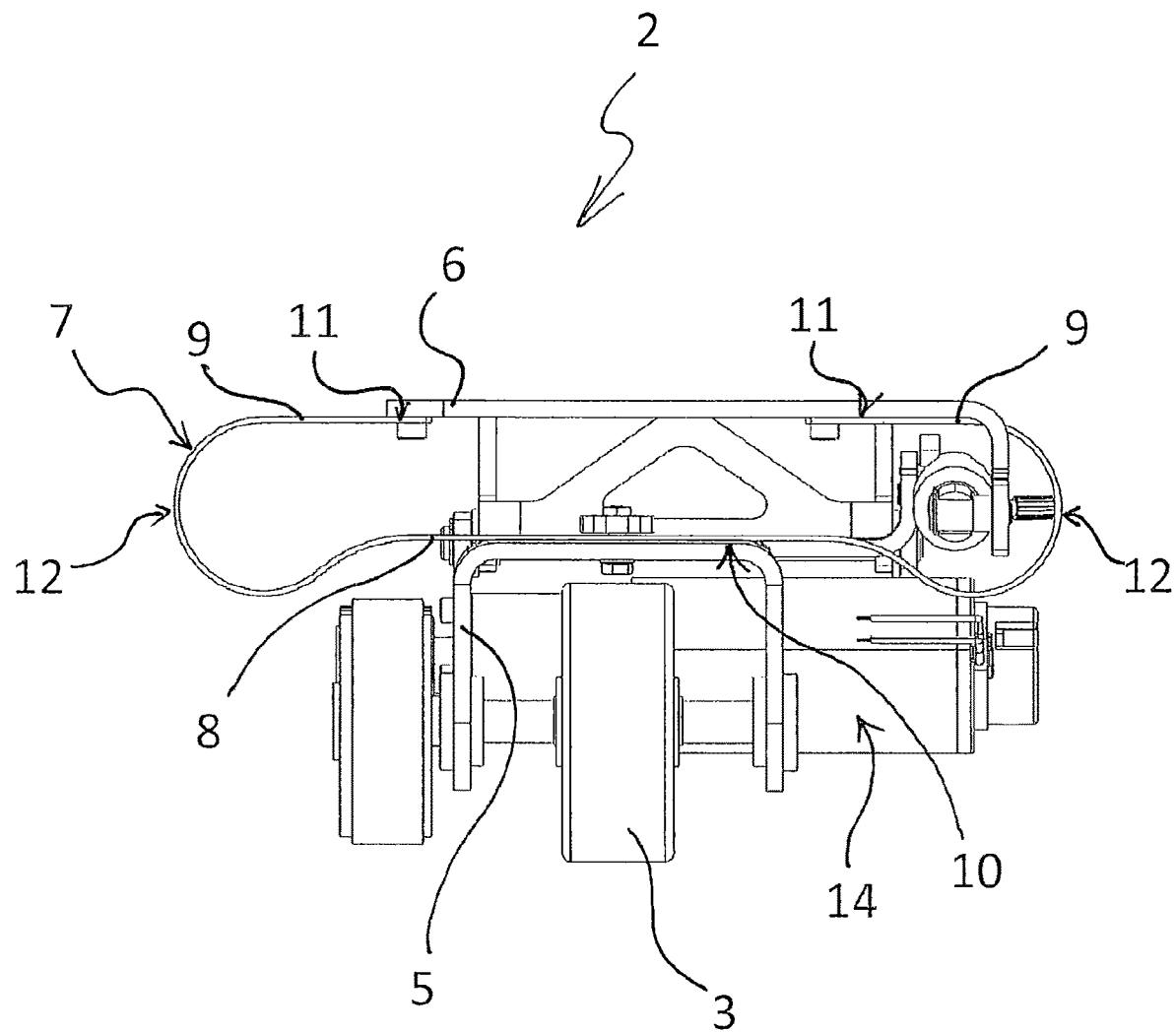
FIG. 3 shows a front view of the embodiment of the castor suspension system of FIG. 2.

FIG. 2 shows an isometric view onto and FIG. 3 shows a front view of an embodiment of the castor suspension system 2 according to the present disclosure. The castor suspension system 2 comprises a pivoting suspension link 5 attachable to the patient support device 1 (FIG. 1). In this embodiment, the pivoting suspension link 5 is supported at the patient support device 1 via a mounting frame 6 as a mounting device; however, a mounting device having another shape can be provided or the pivoting suspension link 5 can be directly supported at the patient support system 1. The castor suspension system 2 suspends the first castor 3 at the patient support device 1.

The castor suspension system 2 further comprises a springy element 7 comprising a leaf spring made of a band deformed such that the band makes two U-turns 12 so that the band has a first leg 8 and two second legs 9. The first leg 8 is provided with a first support portion 10 supported on the pivoting suspension link 5. The second legs 9 are respectively provided with a second support portion 11 for supporting the springy element 7 with respect to the patient support device 1 to provide pre-stress force to the pivoting suspension link 5. In the embodiment shown in FIG. 2 and FIG. 3, the support portion 11 supports on the mounting frame 6, however, in alternative embodiments, the support portion 11 supports on the mounting device having another shape or directly against the patient support system 1. In further alternative embodiments, the first leg 8 can be supported at the mounting device and the second legs 9 can be supported at the pivoting suspension link 5. The band is made of a spring steel. In alternative embodiments, the band can be made of another suitable material, e.g. carbon fiber.

Figure 4:
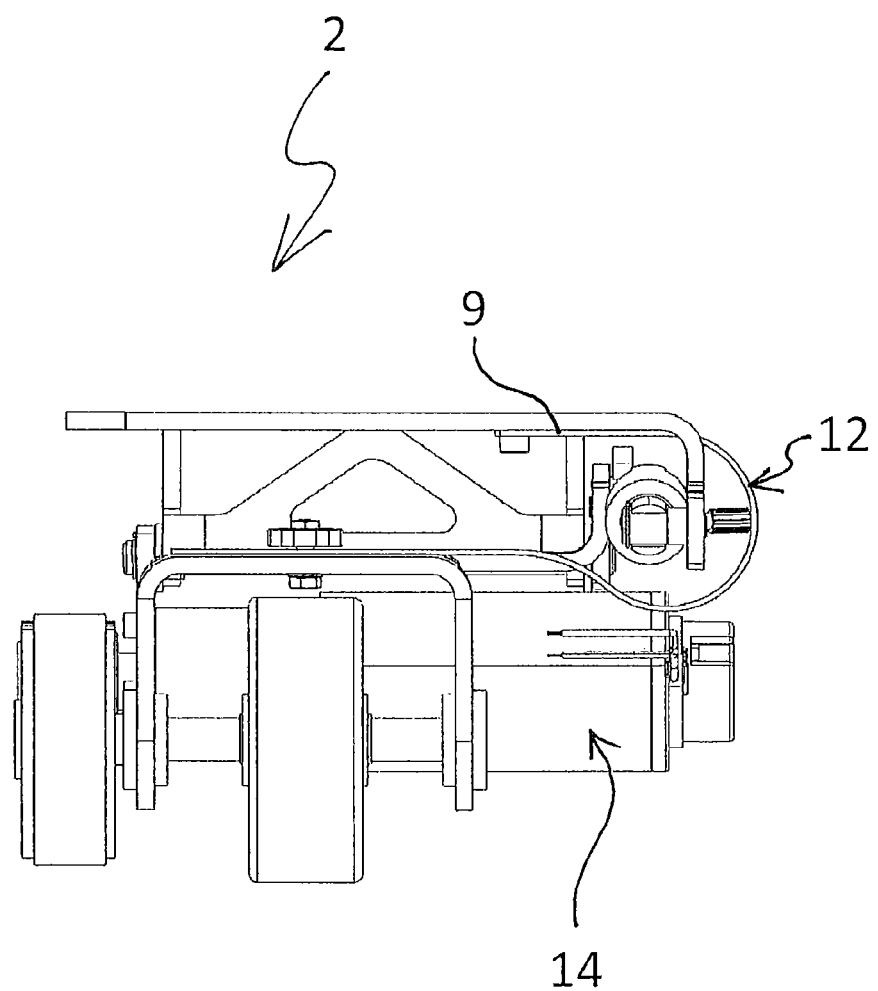
FIG. 4 shows a front view of another embodiment of the castor suspension system.

FIG. 4 shows a front view of another embodiment of the castor suspension system 2. In this embodiment, the band makes only one U-turn 12 such that, compared to the band of the embodiment of the castor suspension system 2 shown in FIG. 3 which makes two U-turns 12 such that it comprises two second legs 9, the band shown in FIG. 4 comprises only one second leg 9.

Figure 5:
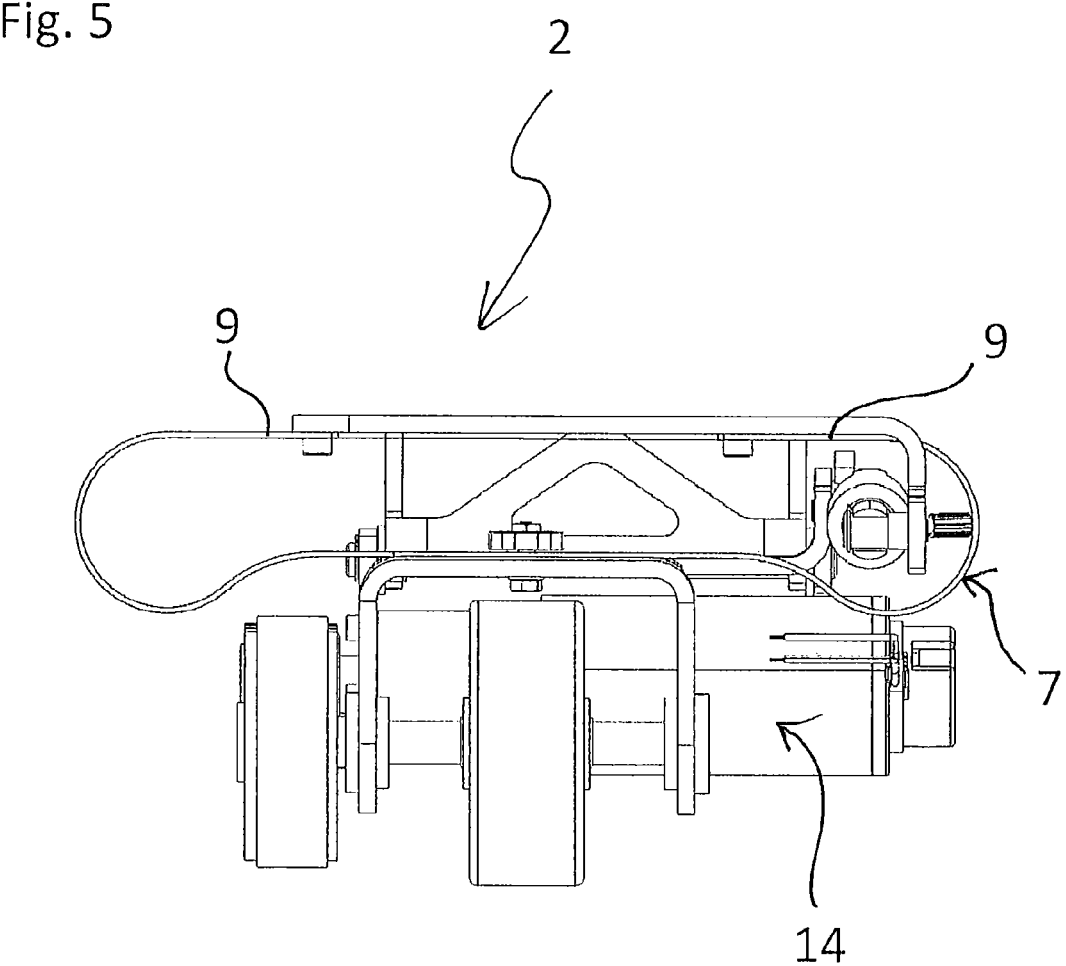
FIG. 5 shows a front view of a further embodiment of the castor suspension system.

The embodiments shown in FIG. 2 to FIG. 4 respectively comprise the springy element 7 which has a shape as an open-loop. Contrary to that, FIG. 5 shows further embodiment of the castor suspension system 2 having the springy element 7 which has the two second legs 9 joined to one another so that it has a shape of a closed-loop.

In the embodiments shown in FIG. 2 to FIG. 5, the castor suspension system 2 is provided with a drive 14 for rotatably driving the first castor 3. Alternatively, the drive 14 is not mandatorily necessary and the first castor 3 can be used only for steering tasks.

Figure 6:
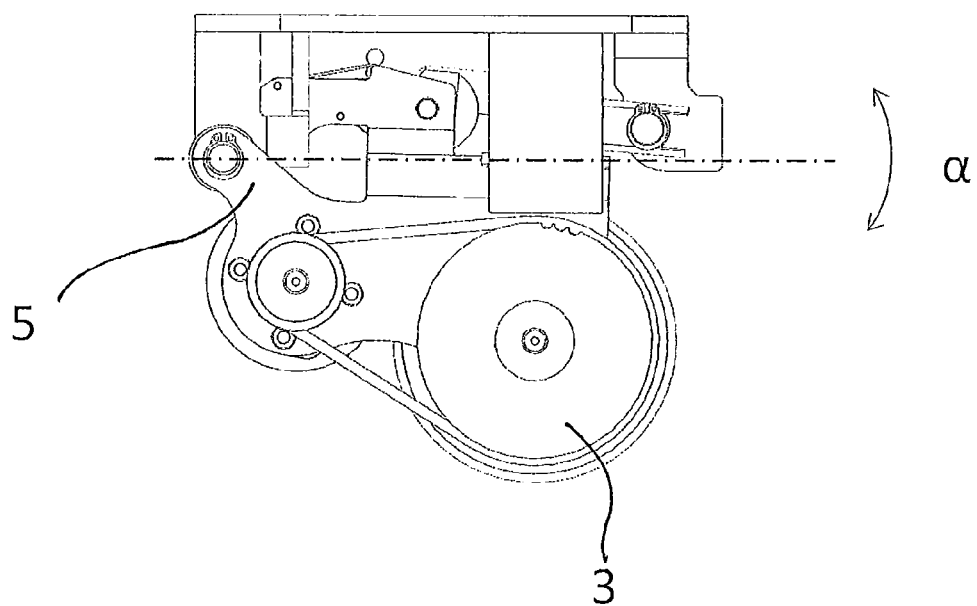
FIG. 6 shows a side view of one of the embodiments of FIG. 3 and FIG. 5.

FIG. 6 shows a side view of the embodiments of FIG. 1 to FIG. 5. As to be seen in FIG. 6, the first castor 3 can be pivoted by the pivot suspension link 5 about a pre-defined angle α.

Figure 7:
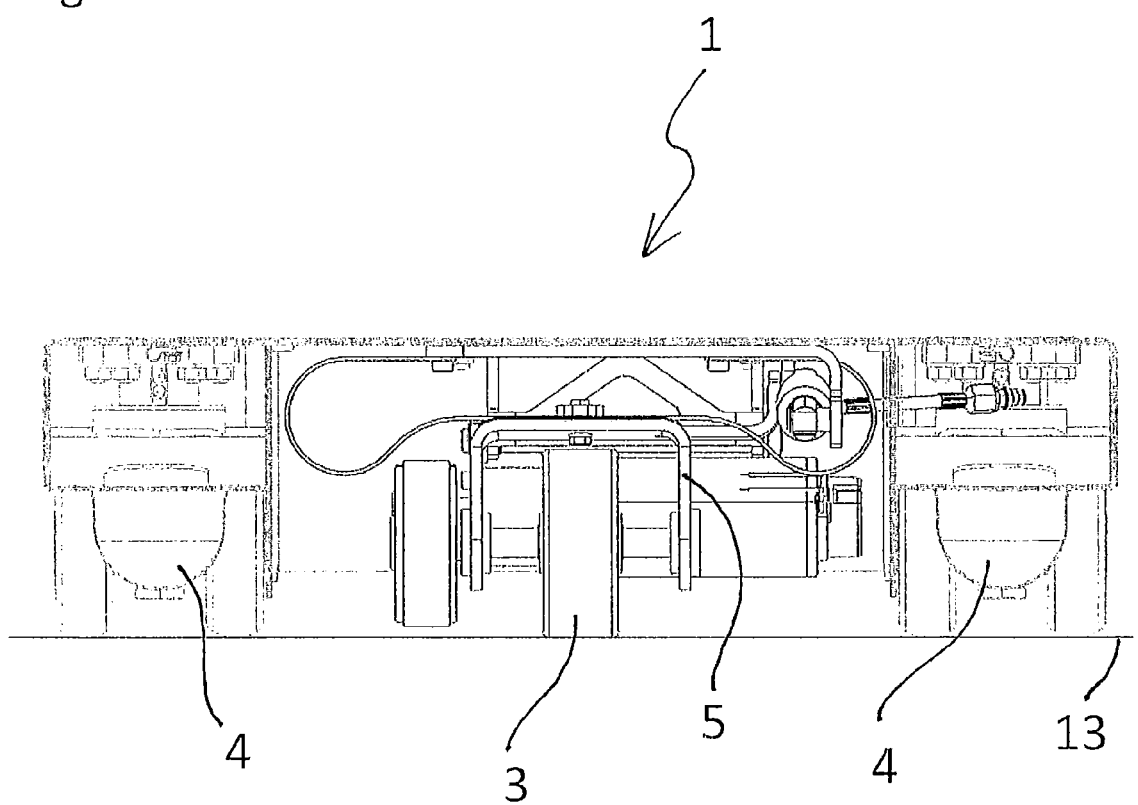
FIG. 7 shows a front view of a bottom portion of the patient support device of FIG. 1 on a plan floor.

FIG. 7 shows a front view of a bottom portion of the patient support device 1 on a plan floor. All of the first castor 3 and the further castors 4 are in contact with the plan floor. As mentioned above, the further castors 4 form the plane 13 and, when the pivoting suspension link 5 is deflected such that the lowest point of the tread of the first castor 3 is located on the plane 13, a contact force to the floor is about 400 N.

Figure 8:
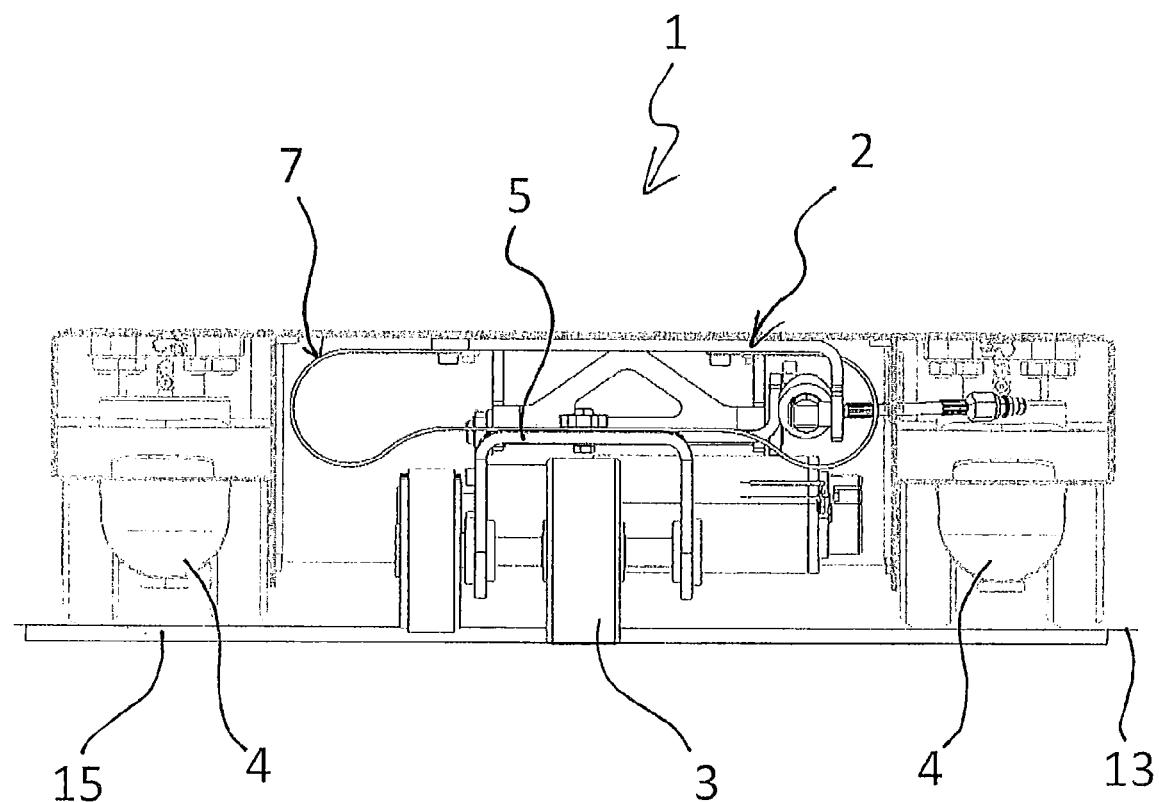
FIG. 8 shows a front view of the bottom portion of the patient support device of FIG. 1 in a simulation when castors in an edge area are crossing an obstacle.

FIG. 8 shows a front view of a bottom portion of the patient support device 1 in a simulation when two of the further castors 4 in the edge area of the patient support device 1 are crossing an obstacle 15. Alternatively only one further castor 4 or more than two further castors 4 are crossing the obstacle 15. This means that one or more of the further castors 4 are lifted with respect to the first castor 3. This situation is shown in FIG. 8 such that the first castor 3 is lowered with respect to the plane 13 generated by the further castors 4. The castor suspension system 2 is configured to pivot the first castor 3 such that the lowest point of the first castor 3 can be moved to 10 mm below the plane 13 and to pre-stress the pivoting suspension link 5 by the springy element 7 in this position of the first castor 3. In alternative embodiments, the suspension link 5 of the castor suspension system 2 can be pivoted such that the first castor 3 is moved more than 10 mm below the plane 13 so that higher obstacles can be crossed.

Figure 9:
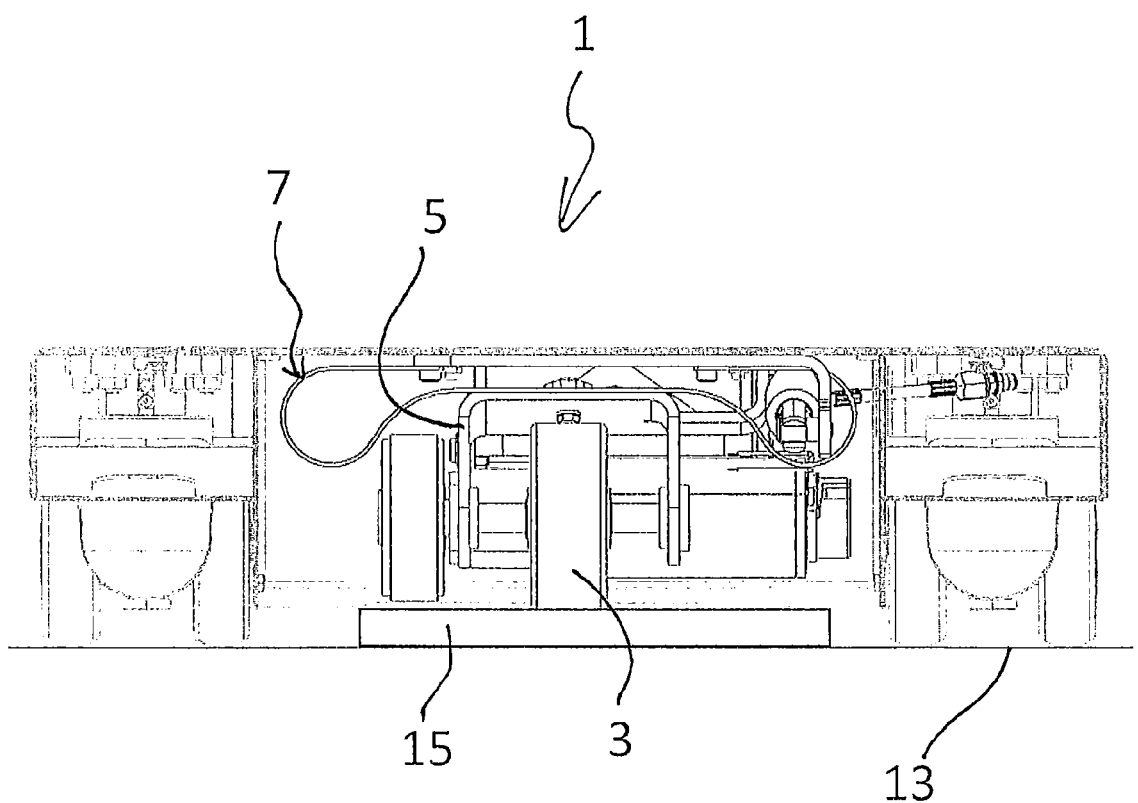
FIG. 9 shows a front view of the bottom portion of the patient support device of FIG. 1 in a simulation when a castor suspended by the castor suspension device is crossing the obstacle.

On the other hand, FIG. 9 shows the front view of the bottom portion of the patient support device 1 in a simulation when the first castor 3 in the central bottom area of the patient support device 1 crosses the obstacle 15. The castor suspension system 2 is configured to pivot the first castor 3 such that the lowest point of the first castor 3 can be moved up to 18 mm above the plane 13 and to pre-stress the pivoting suspension link 5 by the springy element 7 in this position of the first castor 3. In alternative embodiments, the castor suspension system 2 can be pivoted such that the first castor 3 is moved more than 18 mm above the plane 13 such that higher obstacles can be crossed. The downwardly-directed pre-stress force at the first castor 3 is maximally 1300 N if the pivoting suspension link 5 is maximally deflected above the plane, i.e., when a stopper of the castor suspension system 2 is reached.

In use, in a rest position of the patient support system 1, all of the further castors 4 and the first castor 3 are in contact with the floor. The further castors 4 form the plane 13 which is equatable to the floor. The first castor 3 is pre-stressed by the pre-stress force such that the contact force to the floor is about 400 N.

When the patient support system 1 is moved on a plan floor, either by manual force or by the drive 14, all of the further castors 4 and the first castor 3 roll on the floor and the pre-stress force remains roughly at an unchanged value.

Upon crossing the obstacle 15, e.g. a threshold of a door, by the patient support device 1, firstly, one or both of the front castors 4 cross the obstacle 15 and the patient support device 1 is lifted while the first castor 3 is resting on the floor due to the pre-stress force. Thereby, during crossing, the pivoting suspension link 5 pivots downwardly with respect to the patient support device 1 and the pre-stress force by the springy element 7 to the first castor 3 is reduced. Subsequently, the first castor 3 crosses the obstacle 15 and the first castor 3 is lifted with respect plane 13 generated by the further castors 4. Thereby, during crossing, the pivoting suspension link 5 pivots upwardly with respect to the patient support device 1 and the pre-stress force by the springy element 7 to the first castor 3 is enlarged. Finally, one or both of rear castors 4 cross the obstacle 15 and the patient support device 1 is again lifted with respect to the first castor 3. Thereby, during this crossing of the obstacle 15, the pivoting suspension link 5 pivots downwardly with respect to the patient support device 1 and the pre-stress force by the springy element 7 to the first castor 3 is reduced again.

While the invention has been illustrated and described in detail in the drawings and the foregoing description, such illustration and description are to be considered illustrative or exemplary and not restrictive. The invention is not limited to the disclosed embodiment. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A castor suspension system for suspending a first castor at a patient support device, the castor suspension system comprising
   a pivoting suspension link pivotably attachable to the patient support device, and
   a springy element comprising a leaf spring made of a band deformed such that the band makes at least one U-turn so that the band has a first leg and at least one second leg, wherein
   one of the first leg and the at least one second leg is provided with a first support portion supported against and in contact with the pivoting suspension link such that the first support portion is disposed above the first castor, and
   the other of the first leg and the at least one second leg is provided with a second support portion for supporting the springy element with respect to the patient support device such that the springy element is configured to provide a pre-stress force to the pivoting suspension link.

2. The castor suspension system of claim 1, wherein the band is made of a spring band steel.

3. The castor suspension system of claim 2, wherein the springy element comprises two U-turns such that it comprises two second legs.

4. The castor suspension system of claim 3, wherein the springy element has a shape of an open-loop.

5. The castor suspension system of claim 3, wherein the two second legs are joined to one another so that the springy element has a shape of a closed loop.

6. The castor suspension system of claim 1, wherein the springy element comprises two U-turns such that it comprises two second legs, and wherein the two second legs extend toward each other.

7. A patient support device comprising:
   a castor suspension system including
     a pivoting suspension link pivotably attachable to the patient support device, and
     a springy element comprising a leaf spring made of a band deformed such that the band makes at least one U-turn so that the band has a first leg and at least one second leg, wherein
     one of the first leg and the at least one second leg is provided with a first support portion supported against the pivoting suspension link, and
     the other of the first leg and the at least one second leg is provided with a second support portion for supporting the springy element with respect to the patient support device such that the springy element is configured to provide a pre-stress force to the pivoting suspension link, and
   a first castor suspended by the castor suspension system,
   wherein the band is made of a spring band steel,
   wherein the springy element comprises two U-turns such that it comprises two second legs, and
   wherein the two second legs are joined to one another so that the springy element has a shape of a closed loop.

8. The patient support device of claim 7, wherein the castor suspension system is provided with a drive for rotatably driving the first castor.

9. The patient support device of claim 8, wherein the patient support device comprises further castors respectively located in an edge area of the patient support device, wherein lowest points of treads of the further castors form a plane, and the first castor is located in a central bottom area of the patient support device.

10. The patient support device of claim 9, wherein, the castor suspension system is configured to pivot the first castor such that a lowest point of the first castor can be moved to at least 10 mm below the plane, and to pre-stress the pivoting suspension link by the springy element in this position of the first castor.

11. The patient support device of claim 9, wherein the castor suspension system is configured to pivot the first castor such that a lowest point of the first castor can be moved to at least 18 mm above the plane, and to pre-stress the pivoting suspension link by the springy element in this position of the first castor.

12. The patient support device of claim 11, wherein the castor suspension system is configured to provide the pre-stress force to the first castor such that a contact force to a floor is about 400 N when the pivoting suspension link is deflected such that the lowest point of the tread of the first castor is located on the plane.

13. The patient support device of claim 12, wherein the downwardly-directed pre-stress force to the first castor is maximally 1300 N when the pivoting suspension link is maximally deflected above the plane.

14. The patient support device of claim 9, wherein the castor suspension system is configured to provide the pre-stress force to the first castor such that a contact force to a floor is about 400 N when the pivoting suspension link is deflected such that the lowest point of the tread of the first castor is located on the plane.

15. The patient support device of claim 14, wherein the downwardly-directed pre-stress force to the first castor is maximally 1300 N when the pivoting suspension link is maximally deflected above the plane.

16. The patient support device of claim 9, wherein the downwardly-directed pre-stress force to the first castor is maximally 1300 N when the pivoting suspension link is maximally deflected above the plane.

17. A patient support device comprising:
a castor suspension system including
  a pivoting suspension link pivotably attachable to the patient support device, and
  a springy element comprising a leaf spring made of a band deformed such that the band makes at least one U-turn so that the band has a first leg and at least one second leg, wherein
  one of the first leg and the at least one second leg is provided with a first support portion supported against the pivoting suspension link, and
  the other of the first leg and the at least one second leg is provided with a second support portion for supporting the springy element with respect to the patient support device such that the springy element is configured to provide a pre-stress force to the pivoting suspension link, and
a first castor suspended by the castor suspension system,
wherein the springy element comprises two U-turns such that it comprises two second legs, and
wherein a lower end of each of the two U-turns is connected to each other via the first support portion.

18. The castor suspension system of claim 17, wherein a width of the springy element defined along a longitudinal direction of the springy element is larger than a height of the springy element defined along the longitudinal direction.

19. The castor suspension system of claim 18, wherein the springy element is coupled to the pivoting suspension link on a top side of the pivoting suspension link opposite a pivot axis of the pivoting suspension link.

20. The castor suspension system of claim 17, wherein an upper end of each of the two U-turns is connected to the patient support device.

* * * * *